UNITED STATES PATENT OFFICE.

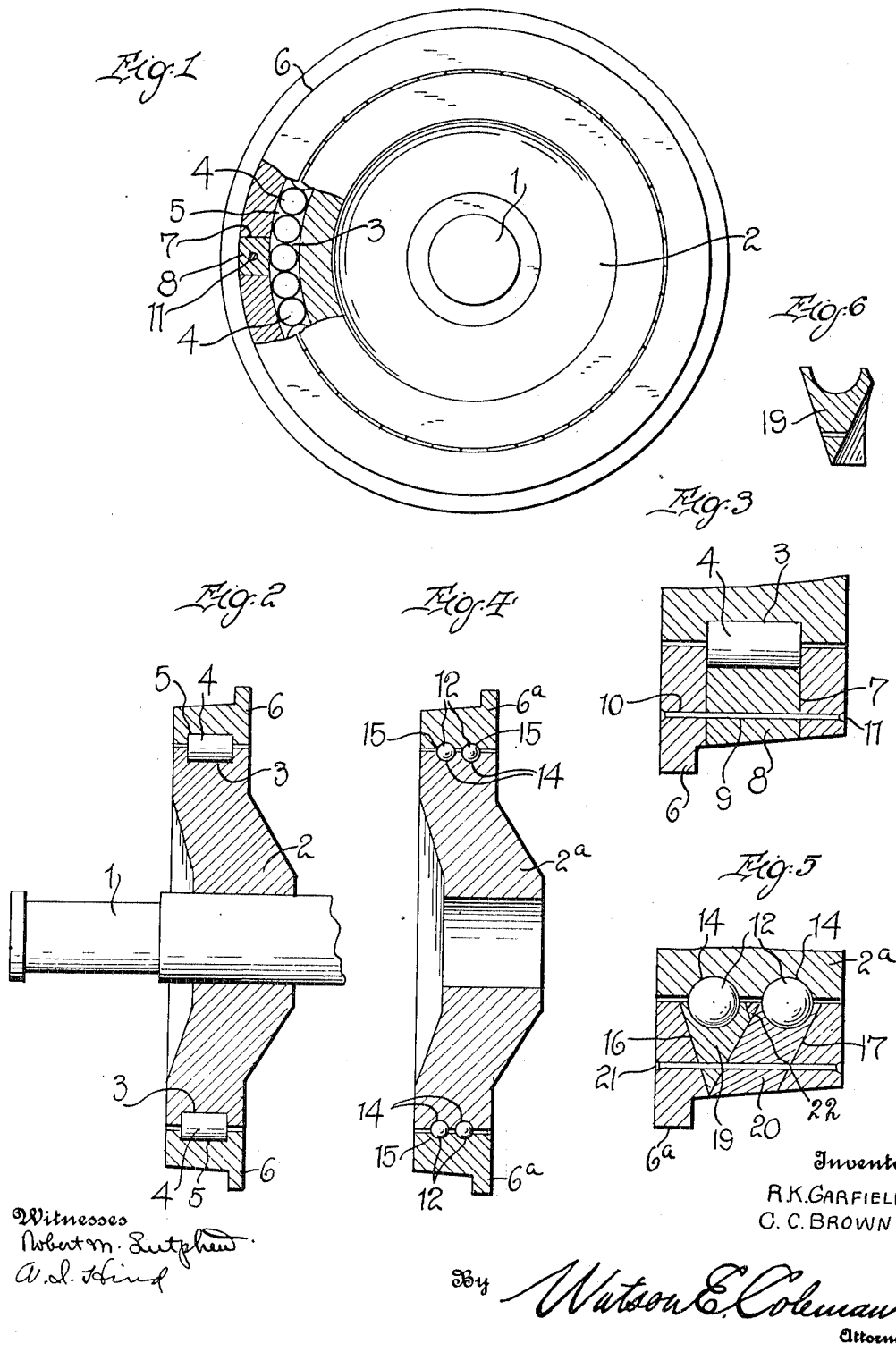

ROBERT K. GARFIELD, OF EL RENO, AND CHARLES C. BROWN, OF GEARY, OKLAHOMA; SAID BROWN ASSIGNOR TO SAID GARFIELD.

CAR-WHEEL.

1,119,945.  Specification of Letters Patent.  Patented Dec. 8, 1914.

Application filed May 2, 1914. Serial No. 835,941.

*To all whom it may concern:*

Be it known that we, ROBERT K. GARFIELD and CHARLES C. BROWN, citizens of the United States, residing, respectively, at El Reno, in the county of Canadian and State of Oklahoma, and Geary, in the county of Blaine and State of Oklahoma, have invented certain new and useful Improvements in Car-Wheels, of which the following is a specification, reference being had to the accompanying drawings.

This invention relates to certain improvements in railway rolling stock and has relation more particularly to a car wheel; and the object of the invention is to provide a wheel of this general character having novel and improved means whereby the intermediate or web portion of the wheel is capable of movement independently of the rim or peripheral portion and whereby such relative independent movements are accomplished with a minimum of friction.

The invention consists in the details of construction and in the combination and arrangement of the several parts of our improved car wheel whereby certain important advantages are attained and the device is rendered simpler, less expensive and otherwise more convenient and advantageous for use, all as will be hereinafter more fully set forth.

The novel features of the invention will be carefully set forth in the appended claims.

In order that our invention may be the better understood, we will now proceed to describe the same with reference to the accompanying drawings, wherein—

Figure 1 is an elevational view, with a part broken away, of a wheel constructed in accordance with an embodiment of our invention; Fig. 2 is a vertical sectional view taken through Fig. 1; Fig. 3 is an enlarged fragmentary sectional view taken through the peripheral portion of the wheel as disclosed in the preceding views and illustrating in detail the means for retaining the anti-friction members in operative position; Fig. 4 is a view somewhat similar to Fig. 2 but illustrating a further embodiment of our invention; Fig. 5 is a view similar to Fig. 3 but illustrating the retaining means for the anti-friction members as disclosed in the form of our invention illustrated in Fig. 4; and Fig. 6 is a fragmentary view in section of one of the plugs employed in the form of our invention set forth in Figs. 4 and 5.

As disclosed in the accompanying drawings, 1 denotes a car wheel axle of the usual type, and operatively engaged with such axle 1 is the web 2 of a car wheel, the periphery of such web being provided, as disclosed in Figs. 1 and 3 with the annular race-way 3, in which is adapted to project the anti-friction members 4, disclosed in such figures as roller bearings, such bearings being also received within an annular race-way 5 produced in the inner wall of the rim member 6 which constitutes the tread surface of the wheel structure. By this arrangement, it will be readily perceived that the web portion 2 is capable of movement or rotation independently of the rim or tread member 6, which arrangement is particularly advantageous at such times when a car, to which the wheel is applied, is rounding a curve, and thus overcoming a disadvantage which is believed to be manifest to those skilled in the art to which the present invention appertains.

In order that the wheel structure may be properly assembled, we provide the rim or tread member 6 at a predetermined point with the radially disposed opening 7 through which the anti-friction members 4 may be directed in order to properly position such members between the web 2 and the rim or tread member 6.

The radial opening 7 is adapted to be closed after the anti-friction members have been properly applied by a block 8 snugly fitting within such opening and of a size to have its outer face, when applied, substantially flush with the periphery of the member 6 and its inner face flush with the base of the race-way 5 and in order to maintain such block 8 against accidental displacement, we provide the same with a lateral opening 9 adapted to register with suitable openings 10 produced in the adjacent side portions of the rim or member 6 and through such registering openings is adapted to be directed a suitable anchoring member 11, herein disclosed as a conventional rivet.

As is believed to be self-evident and as is particularly illustrated in Fig. 4, the anti-friction members may comprise the spherical bodies 12, and, when so desired, such spherical bodies may be disposed in duplicate series, in which event the web 2ª is provided with the concentric annular race-ways 14 of requisite form in cross section and the rim or tread member 6ª is provided with the corresponding or complementary race-ways 15. In this latter form of our invention and as is particularly in Fig. 5 the tread member 6ª is provided with the inwardly diverging openings 16 and 17 in communication with the race-way 15, whereby the spherical bodies 12 may be properly applied, the upper extremities of the openings being separated by the septum 22. In order to close the diverging openings 16 and 17, one of such openings, herein disclosed as 16, has snugly engaged therewith the block or plug 19 having its outer extremity disposed on a requisite incline and suitably convexed whereby such outer extremity of the block 19 will be disposed in substantial continuity with the walls of the opening 17, in which opening is adapted to be inserted the block 20. In order to maintain these blocks 19 and 20 against displacement, the rivet 21 is disposed therethrough and through the adjacent portions of the tread member or rim 6ª whereby it will be readily perceived that a single rivet or retaining member serves to maintain both of the blocks in proper position.

From the foregoing description, it is thought to be obvious that a car wheel constructed in accordance with our invention is of an extremely simple and comparatively inexpensive nature and is particularly well adapted for use by reason of the convenience and facility with which it may be assembled and by reason of the effectiveness with which it performs its functions, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

Having thus fully described our invention what we desire to claim and secure by Letters Patent, is:—

1. A car wheel comprising a web portion provided with concentric annular flanges in its periphery, a tread member surrounding such web portion and provided with race-ways complementary to the race-ways of the web portion, anti-friction members adapted to be received within the complementary race-ways, such tread member being provided with inwardly diverging openings through which the anti-friction members are adapted to be directed, blocks for closing such openings, and means common to both of such blocks for maintaining the same against displacement.

2. A car wheel comprising a web portion provided with concentric annular flanges in its periphery, a tread member surrounding such web portion and provided with race-ways complementary to the race-ways of the web portion, anti-friction members adapted to be received within the complementary race-ways, such tread member being provided with inwardly diverging openings through which the anti-friction members are adapted to be directed, blocks for closing such openings, and means common to both of such blocks for maintaining the same against displacement, one of such blocks intersecting the second block.

In testimony whereof we hereunto affix our signatures in the presence of two witnesses.

ROBERT K. GARFIELD.
CHARLES C. BROWN.

Witnesses to Robert K. Garfield:
  J. I. PHELPS,
  W. N. RILEY.
Witnesses to Charles C. Brown:
  FRANK H. LASH,
  G. S. HENSLEY.